United States Patent [19]

Lee

[11] Patent Number: 5,064,273

[45] Date of Patent: Nov. 12, 1991

[54] REAR PROJECTION SCREEN WITH DOUBLE SHEET

[75] Inventor: Dong H. Lee, Seoul, Rep. of Korea

[73] Assignee: Goldstar Co., Ltd., Seoul, Rep. of Korea

[21] Appl. No.: 602,663

[22] Filed: Oct. 24, 1990

[30] Foreign Application Priority Data

Oct. 24, 1989 [KR] Rep. of Korea ............... 15308/1989

[51] Int. Cl.$^5$ ............................................. G03B 21/60
[52] U.S. Cl. .................................................. 359/457
[58] Field of Search ..................... 350/123, 126, 128; 358/60

[56] References Cited

U.S. PATENT DOCUMENTS

| | | | |
|---|---|---|---|
| 4,054,907 | 10/1977 | Itoh et al. | 350/128 |
| 4,147,408 | 4/1979 | Plummer | 350/128 |
| 4,452,509 | 6/1984 | Van Breemen | 350/128 |
| 4,468,092 | 8/1984 | Inoue et al. | 350/128 |
| 4,531,812 | 7/1985 | Oguino | 350/128 |
| 4,635,035 | 1/1987 | Clausen et al. | 350/128 |
| 4,725,134 | 2/1988 | Ogino | 350/128 X |
| 4,923,280 | 5/1990 | Clausen et al. | 350/128 |
| 4,936,652 | 6/1990 | Clausen et al. | 350/128 |

Primary Examiner—Richard A. Wintercorn
Attorney, Agent, or Firm—Birch, Stewart, Kolasch & Birch

[57] ABSTRACT

A rear projection screen comprises a first sheet formed with a Fresnel lens and vertical lenticular lenses on both surfaces of a first transparent sheet made of synthetic resin, and a second sheet formed with a horizontal grating on one surface of a second transparent sheet made of synthetic resin and also formed with a horizontal grating or fine mat surface layer and simultaneously a black striped layer on the other surface thereof so that they are assembled so as to be faced each other, whereby whole screen brightness and screen brightness uniformity as well as contrast are improved and can be advantageously used for the screen for three dimensional projectors.

4 Claims, 3 Drawing Sheets

REAR PROJECTION SCREEN WITH DOUBLE SHEET

BACKGROUND OF THE INVENTION

1. Field of the Invention

The present invention relates to a rear projection screen with a double sheet for use in projectors and projection televisions and more particularly, to a rear projection screen with a double sheet which is structured with a first sheet formed with a Fresnel lens and vertical lenticular lenses disposed on both surfaces of a first transparent sheet made of synthetic resin, and a second sheet formed with a horizontal grating disposed on one surface of a second transparent sheet made of synthetic resin and also formed with a horizontal grating or a fine mat surface layer and simultaneously a black striped layer disposed on the other surface of the second transparent sheet so that brightness and contrast of the screen are improved.

2. Description of the Prior Art

A conventional projection television is, as shown in FIG. 1, structured with a color picture tube 2 attached with a projection lens 3 maintained at a predetermined distance from a screen 1, and the screen 1 is formed with a Fresnel lens 4 disposed on a surface directing to the projection lens 3 and lenticular lenses 5 disposed on the opposite surface in various forms as shown in FIG. 2.

Diffusers such as $SiO_2$, $CaCO_3$, $TiO_3$, $BaSO_4$, $ZnO$, $Al(OH)_3$, and fine powdered glass are added to the interior of the screen 1, or a fine mat surface layer is formed on the surface of the screen 1, or else diffuser addition and fine mat surface layer formation are executed together.

The Fresnel lens 4 serves a field lens function for an image beam directed from the projection lens 3, thereby converging the image beam directed to the screen 1 toward an observer. At this moment, the directed image beam is diffused by the diffuser or fine mat surface layer during passing the screen 1. This diffusing degree depends on the control of density or thickness of the diffuser or fine mat surface layer. This is determined according to a desired vertical angle of a field view. A lenticular lens 5 serves as a function for further diffusing the directed image beam come out by diffusing according to the process as aforementioned into the desired horizontal angle of the field view toward horizontal direction, and the observer recognizes the directed image focusing on the screen 1 according to the process.

The conventional rear projection screen as aforementioned includes a loss of transmitted beam according to the surface reflection of the screen 1 but also it is added with loss of transmitted beam according to the backward reflection appeared by addition of the diffuser or formation of fine mat surface layer, whereby brightness of the entire screen 1 is decreased and since shapes of lenticulars are all same, difference of brightness at the corner and center of the screen 1 is increased to, thereby causing a decrease of brightness uniformity. It causes contrast decrease of screen image according to the external light.

SUMMARY OF THE INVENTION

Accordingly, it is an object of the present invention to provide a rear projection screen with a double sheet which eliminates the above problems encountered in a conventional rear projection screen.

Another object of the present invention is to provide a rear projection screen which comprises a first sheet formed with a Fresnel lens disposed on one surface of a first transparent sheet made of synthetic resin and also formed with vertical lenticular lens disposed on the other surface thereof, and a second sheet formed with a horizontal grating disposed on one surface of a second transparent sheet made of synthetic resin and also formed with a horizontal grating or fine mat surface layer, and a black striped layer disposed on the other surface of the second transparent sheet for directing an observer, whereby the first and second sheets are assembled such a manner that the vertical lenticular lens of the first sheet and the horizontal grating disposed on one surface of the second sheet face one another.

A further object of the present invention is to provide an improved rear projection screen which comprises a Fresnel lens of a first sheet facing a projection lens of a color picture tube and a black stripe of a second sheet facing the observer, whereby when image beam is projected from the projection lens of the color picture tube, thereby passing a vertical lenticular lens of the first sheet, the image beam proceeds approximately in parallel with a center light axis of the rear screen, thereby passing the vertical lenticular lens of the second sheet, it is diverged to a predetermined angle of field view around the observer, thereby passing the horizontal grating of the second sheet, it proceeds by diverging toward the vertical direction, and thereby passing the vertical grating or fine mat surface layer, it diverges vertically or vertically and horizontally so that the image beam can be obtained, which has vertical and horizontal angles of field view diverging tenderly and uniformly over whole surface of the rear screen, and a black striped layer absorbs an external light thereby improving the contrast and brightness against the external light.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a rear projection screen comprises a first sheet formed with a Fresnel lens and a vertical lenticular lens on both surfaces of a first transparent sheet made of synthetic resin, and a second sheet formed with a horizontal grating on one surface of a second transparent sheet made of synthetic resin and also formed with a horizontal grating or fine mat surface layer and simultaneously a black striped layer on the other surface thereof so that they are assembled so as to be faced each other, whereby whole screen brightness and screen brightness uniformity as well as contrast are improved and can be advantageously used for the screen for three dimensional projectors.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
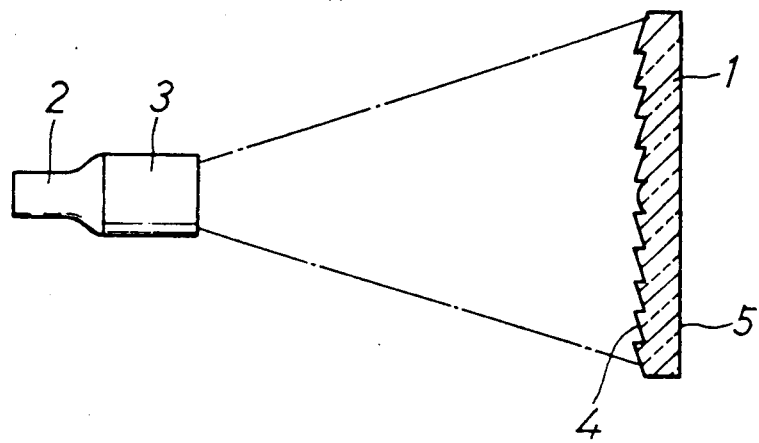
FIG. 1 is a schematic diagram of a conventional rear projection screen of a projector.
Figure 2A:
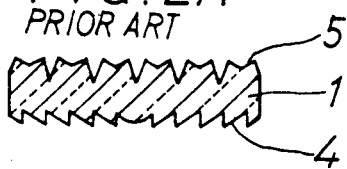
FIG. 2A, 2B, and 2C are cross-sectional views of various exemplary forms of the conventional rear projection screen.
Figure 2B:
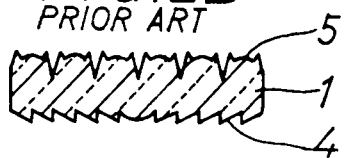
Figure 2C:
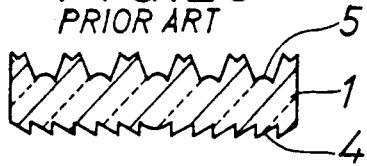
Figure 3:
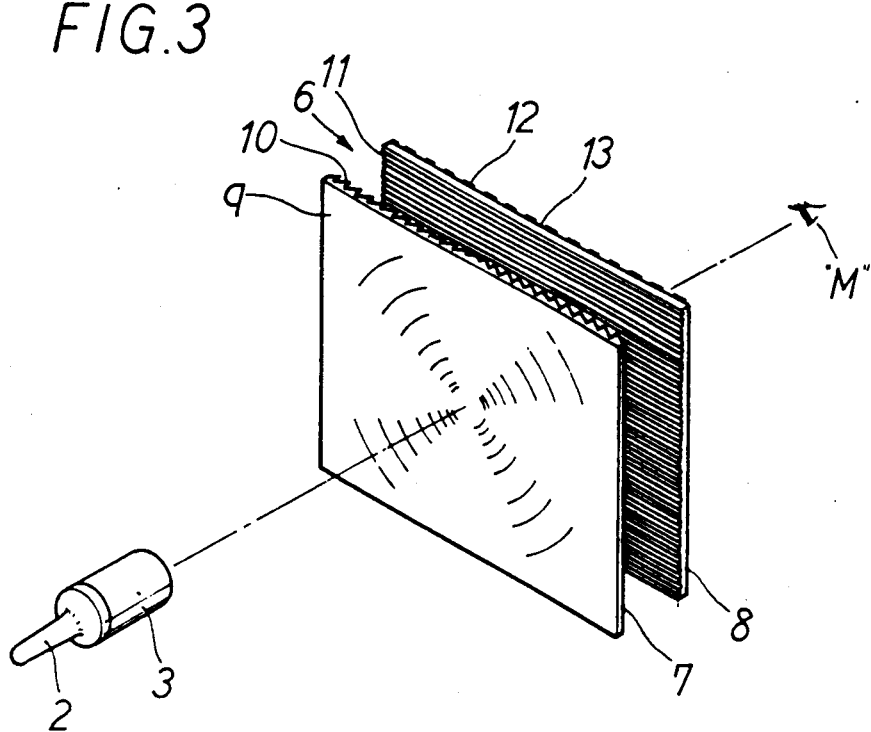
FIG. 3 is a perspective view of the rear projection screen according to the present invention.
Figure 4:
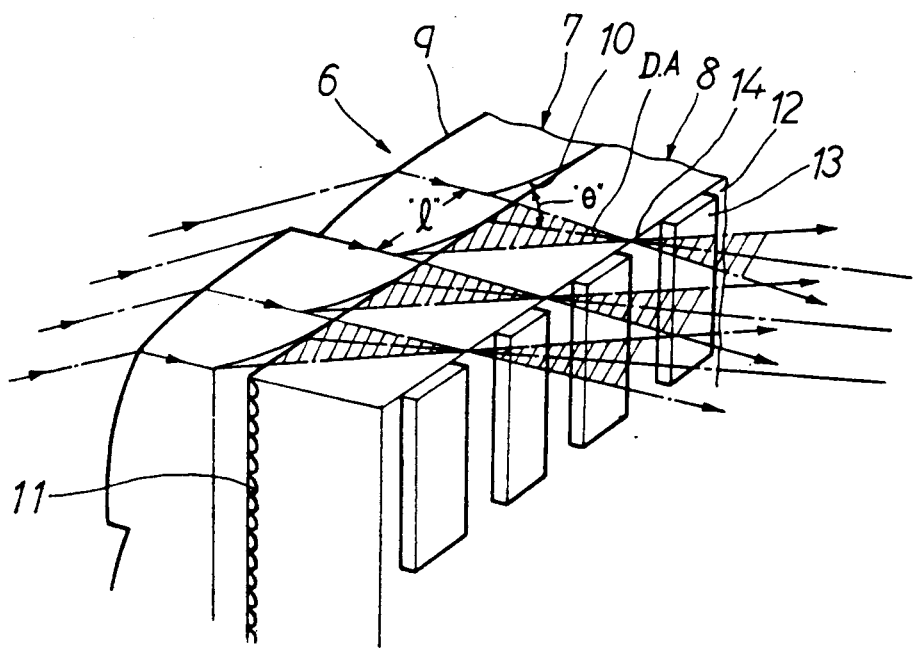
FIG. 4 is a magnified fragmentary perspective view of the rear projection screen according to the present invention showing basic elements thereof.

Referring now in detail to the drawings for the purpose of illustrating preferred embodiments of the present invention, the rear projection screen with a double sheet as shown in FIGS. 3 and 4, comprises a first sheet 7 made of synthetic resin, a vertical lenticular lens 10 formed on the outer surface thereof, and a second sheet 8 formed with a horizontal grating 11 which is formed on the inner surface of a second transparent sheet made of synthetic resin and also a horizontal grating formed or fine mat surface layer 12 which is formed and simultaneously a plurality of black striped of a layer 13 are formed on the outer surface, i.e., on the surface facing an observer M.

The vertical lenticular lens 10 is formed in large numbers with a predetermined width and slant of each adjusted surface so as to have a predetermined angle of a field view around the observer M distanced away some degree toward the vertical direction against a screen 6 from the center of the screen 6, whereby brightness within the angle of the field view becomes to be uniform. That is, as shown in FIGS. 4 and 6, by controlling continuous change of surface slant and distribution infinitesimal area of corresponding surface slant at each unit lenticular lens, a proceeding angle $\theta$ toward the central direction of the observer M of principal beam of image beam which is passed each unit lenticular lens going to outward from the center in the lateral direction is decreased so that it becomes to be gradually bent and simultaneously beam angle of the field view becomes to be uniform by having a predetermined angle of the field view around the observer M.

Each shape of the lenticular lens 10 can be embodied variously so as to be matched to the condition such as a standard for a material of an using sheet as well as a state that the observer M observes the screen 6.

Figure 6:
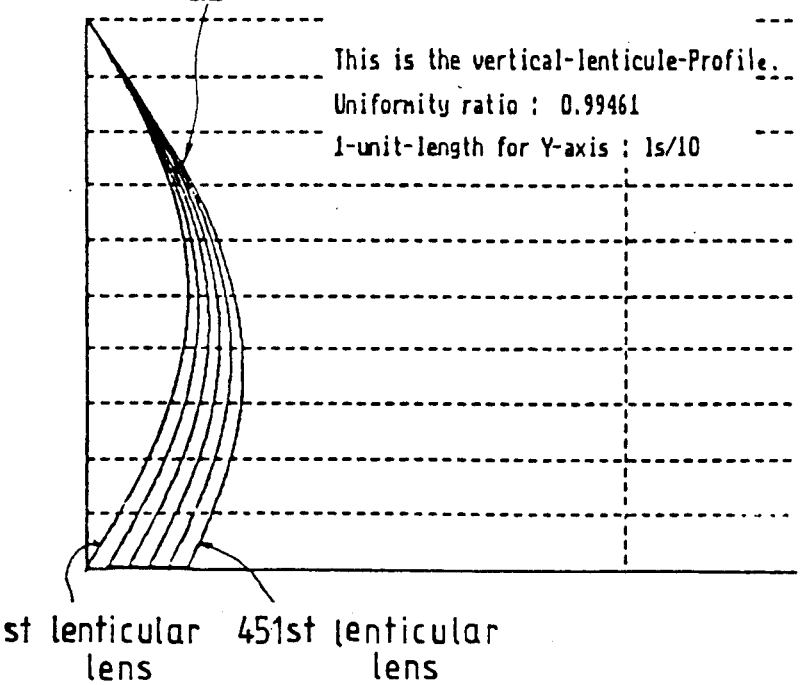
FIG. 6 is a graph showing examples of designing cross section of vertical lenticular lens according to the present invention.

FIG. 6 shows examples of designing of cross section of the lenticular lens 10. This represents a result for PMMA that an angle of the field view is about 45° against the observer M who is distanced by 4 m away from the screen 6 a width 1 of each unit lenticular lens is 1.0 mm, and a refraction index is 1.492. In this graph, an uniformity ratio represents the ratio of capability that the unit lenticular lens of the center and edge of the lenticular lens 10 distanced by 450 mm away from the center can transmit against the projection image beam of equal quantity and patterns of curved lines C.L. in graph represent the cross sections of the lenticular lenses 10 at location distanced by 90 mm away from unit lenticular lens of the center.

The lenticular lens 10 is formed such a manner that bending degree of cross section is gradually decreased while going toward the unit lenticular lens of the center. That is, the unit lenticular lens of edge in a first lenticular lens, i.e., 451 lenticular lens.

Figure 5A:
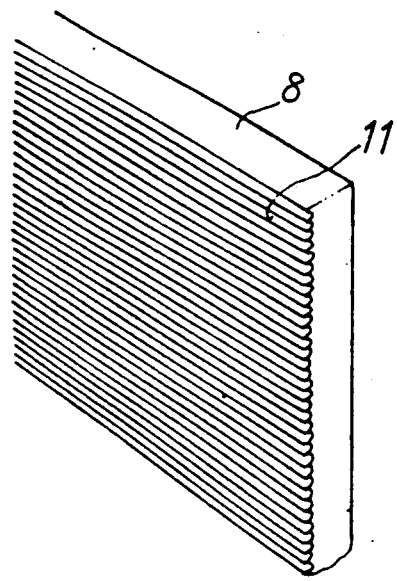
FIG. 5A and 5B are partial perspective views of a second sheet according to the present invention.
Figure 5B:
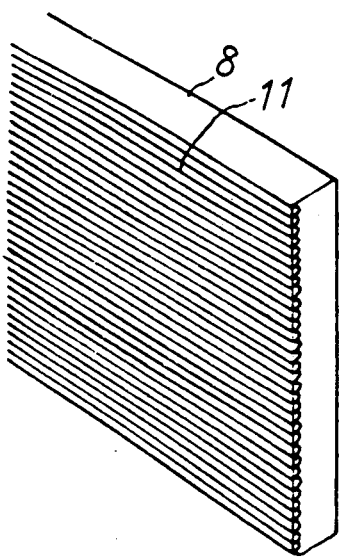

The horizontal grating 11 is made to diverge the image beam so as to have vertical angle of the field view by forming into a predetermined distance in cross sectional forms, respectively, as shown in FIGS. 5A and 5B. FIG. 5A shows that the grating 11 of simple convex and concave arranged horizontally, and 5B shows that the convex and concave portions are buried with other resin being of different in refraction index on the grating surface, whereby said surface is made in flat.

The horizontal grating 11 can be formed in various forms of other than the form of FIGS. 5A and 5B, and the function of these grating 11 serves to diverge the image beam diverged toward the vertical direction.

On the surface of the observer's side of the horizontal grating either horizontal grating 11 is formed for further diverging the projected image beam, or as fine mat surface layer 12 is formed for making the divergence to be more tender and the black striped layer 13 is formed for decreasing the contrast deterioration according to the external light. The horizontal stripes layer 13 is formed by arranging side by side with keeping a predetermined distance as shown in FIG. 4 so as not to encroach the diverging area D.A. of the vertical lenticular lens 10 of the side of the projection lens 3. That is, it is not to obstruct a passing way 14 of diverging beam according to the vertical lenticular lens 10.

When the projection image beam from the projection lens 3 is transmitted to the surface of the Fresnel lens 9 which is a first surface of the screen 6 constructed as these, this beam proceeds in parallel to the center light axis of the screen 6 or with converging angle of some degree. And successively, it becomes to pass the vertical lenticular lens 10 which is a second surface wherein the horizontal beam becomes diverged with a predetermined angle of the field view around the observer M on the surface of the lenticular lens 10, respectively. When these beams become to pass the horizontal grating 11 which is a third surface, they become to proceed by diverging to the horizontal direction on the surface of the horizontal grating. Therefore, such image beam having horizontal and vertical angle of the field view which passes the horizontal grating 11 or fine mat surface layer 12, thereby being distributed more tenderly and appropriately obtained. The black stripe layer 13 absorbs the external light, thereby improving the contrast and brightness against the external light of the screen 6.

And, in embodying the present invention, a surface inclination and infinitesimal area of the lenticular lens 10 are appropriately adjusted, whereby the horizontal angle of the field view according to the unit lenticular lens of a central portion of the screen 6 becomes larger than the horizontal angle of the field view according to the unit lenticular lens of a screen corner portion. The horizontal angle of the field view of the unit lenticular lens between them is gradually decreased as it goes to the corner side of the unit lenticular lens so that the surface of the brightness of the whole screen 6 is made to be uniform within a predetermined angle of the field view, whereby the brightness uniformity of the screen 6 can be either improved or controlled as an intention of the designer.

The present invention as described above has advantages that whole screen brightness and screen brightness uniformity are improved and also the contrast deterioration according to the external light is prevented, whereby the contrast is improved.

The rear projection screen according to the present invention can be advantageously used also for the slide projector screen as well as the rear projection screen three dimensional projectors.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A rear projection screen for projectors, which comprises:

a first sheet including a Fresnel lens formed on the inner surface facing a projection lens of a first transparent sheet made of resin and horizontal lenticular lenses formed on the opposite surface thereof and a second sheet including a horizontal grating formed on the inner surface facing said projection lens of a second transparent sheet made of resin and a horizontal grating or a fine mat surface layer formed on the outer surface facing an observer as well as a number of vertical black stripes layer formed, whereby the first sheet and the second sheet are assembled so as to face each other for improving the whole screen brightness and brightness uniformity and preventing contrast deterioration according to the external light.

2. The rear projection screen of claim 1, wherein the cross section of each unit lenticular lens provided to said horizontal lenticular lens is a curved plane formed by controlling distribution of slant and infinitesimal area of corresponding slant so as to be able to diverge uniformly the projection image beam within a predetermined horizontal angle of field view range around an observer on the screen light axis distanced away from the screen.

3. The rear projection screen of claim 1, wherein the horizontal grating formed on said second sheet has a convex and concave cross section.

4. The rear projection screen of claim 3, wherein the convex and concave portion of said horizontal grating are buried by attaching a resin having a refraction index different from that of said horizontal grating.

* * * * *